(No Model.) 2 Sheets—Sheet 1.

C. HAGGENMACHER.
APPARATUS FOR PURIFYING OR SORTING GRITS, &c.

No. 467,987. Patented Feb. 2, 1892.

Witnesses:
Walter Allen
J. W. Mister

Inventor.
C. Haggenmacher.
by Herbert W. Jenner.
Attorney.

(No Model.) 2 Sheets—Sheet 2.

C. HAGGENMACHER.
APPARATUS FOR PURIFYING OR SORTING GRITS, &c.

No. 467,987. Patented Feb. 2, 1892.

Witnesses:
Walter Allen
J. D. Wister

Inventor:
C. Haggenmacher
by Herbert W. Jenner
atty.

THE NORRIS PETERS CO., PHOTO-LITHO., WASHINGTON, D. C.

UNITED STATES PATENT OFFICE.

CARL HAGGENMACHER, OF BUDA-PESTH, AUSTRIA-HUNGARY.

APPARATUS FOR PURIFYING OR SORTING GRITS, &c.

SPECIFICATION forming part of Letters Patent No. 467,987, dated February 2, 1892.

Application filed July 11, 1891. Serial No. 399,264. (No model.)

*To all whom it may concern:*

Be it known that I, CARL HAGGENMACHER, a director of flour-mills, and a citizen of Switzerland, residing at Buda-Pesth, in the Empire of Austria-Hungary, have invented certain new and useful Improvements in Apparatus for Purifying or Sorting Grits or Semolina or other Granular Substances by Means of a Single Air-Current; and I do hereby declare the following to be a full, clear, and exact description of the invention, such as will enable others skilled in the art to which it appertains to make and use the same.

In the various processes and apparatus heretofore employed for cleansing or purifying grits, semolina, or other granular substances, these substances are generally passed repeatedly through divided currents of air, in order to effect the sorting or purifying thereof as perfectly as possible.

According to the present invention, the most perfect sorting or purifying of such granular substances is obtained by means of a single air-current, which remains undivided during its entire course, this being effected in such manner that the air-current passing through the apparatus in an upward direction is made to meet the granular material descending by gravity and to raise the separate granules to a greater or less height in proportion to their weight, thereby causing them to fall into separate receptacles arranged at different heights below and along the air-current. By this means the grits or other granular material will become sorted in such manner that the lightest granules will be contained in the uppermost receptacles and the heaviest in the lowermost ones.

The accompanying drawings show various arrangements of apparatus for carrying out this method of operating. I will proceed to describe the practical carrying out of the process with reference thereto.

As the several constructions are similar to each other as regards the essential features, the same parts in each figure are indicated by the same letters of reference.

Figure 1:
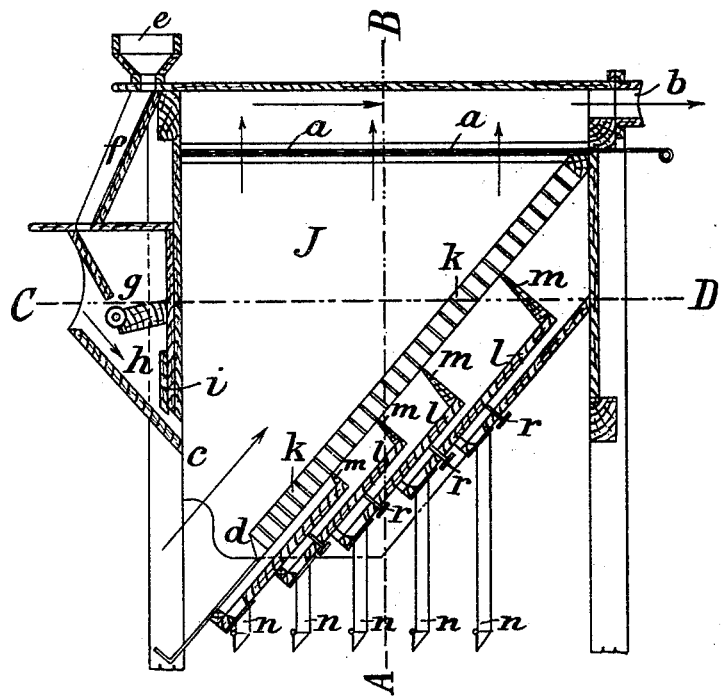
Figure 2:
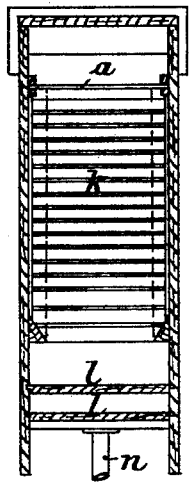
Figure 3:
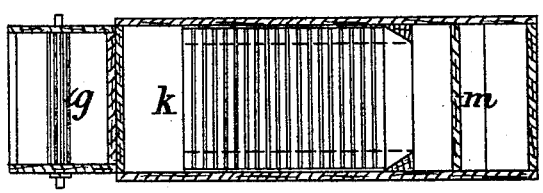

Figure 1 shows a longitudinal section of one construction. Fig. 2 shows a vertical section of the same, taken on the line A B in Fig. 1; and Fig. 3 shows a horizontal section taken on the line C D in Fig. 1. The remaining figures show modifications.

The air current or blast to be employed for sorting or purifying is led in the direction of the arrow through the casing J of the apparatus, provided with a regulating-slide $a$, either the branch pipe $b$ for the discharge being connected to the suction of the fan or blower, or the inlet-opening $c\,d$ for the air-current being connected to the discharge of such fan. The grits, which have been previously sorted by screening according to the size of granules, pass through the hopper $e$ onto the distributing-chute $f$, from which they pass onto the feeding-roller $g$, and thence through the supply-chute $h$, provided with a regulating-slide $i$, into the rising air-current, by which they are raised and sorted. The heaviest particles fall into the bottom compartments of a register-frame $k$, while the lighter and lightest particles fall, in proportion to their weight, into the middle compartments, so that the lighter they are the higher up they are deposited, and, lastly, the grits offal is deposited in the uppermost compartments of the frame. From these compartments the grits and grits offal descend through the register-frame $k$ into the collecting-boxes $l$. The different kinds of grits and grits offal are led off through chutes $n\,n$, which are connected to openings in the partitions $m$ of the receptacles $l$. The several partitions forming the receptacles $l\,m$ are capable of being adjusted by sliding them up or down behind each other, so as to make each compartment of greater or less width. When adjusted, they are secured in position by set-screws $r$.

Figure 4:
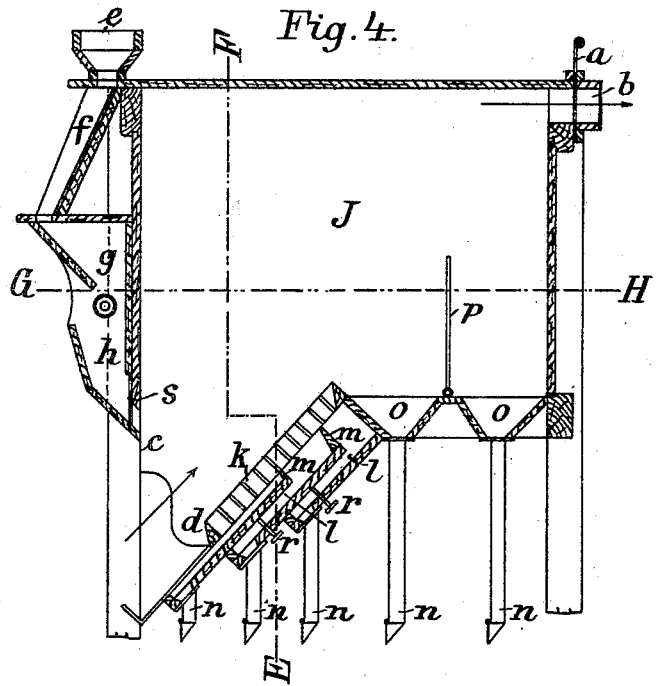
Figure 5:
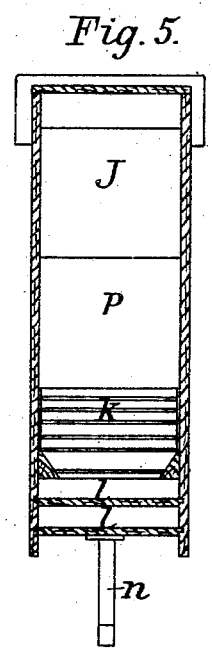
Figure 6:
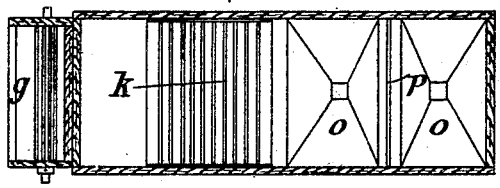

Figs. 4, 5, and 6 show a second arrangement of the apparatus. Fig. 4 shows a longitudinal section; Fig. 5, a vertical section taken on the line E F in Fig. 4, and Fig. 6 a horizontal section taken on the line G H in Fig. 4. In this arrangement the register-frame $k$ is made shorter than in the arrangement first described, so that at the back of the frame two collecting boxes or hoppers $o$ are situated. The grits offal is consequently propelled beyond the register-frame into the collecting-boxes $o$. A flap $p$, placed between the latter, serves for regulating the qualities in these compartments. The flap *s* in this arrangement serves for cutting off the detrimental air-current, in particular in the case when the apparatus works with air-pressure.

Figure 7:
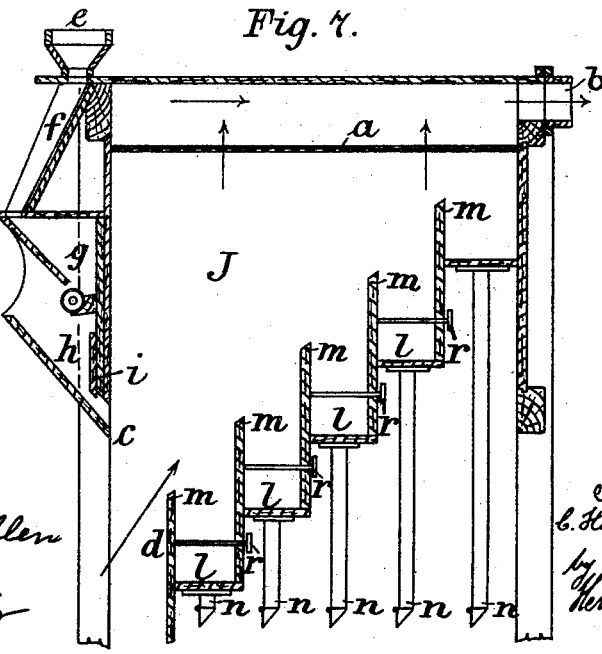

Fig. 7 shows a longitudinal section to a smaller scale than the preceding of an arrangement which differs from the preceding ones, in that the register-frame *k* is done away with, the vertical walls *m* of the collecting-compartments forming the partitions for the several descriptions of grits and grits offal.

In all these constructions the compartments *l* and *o* can be variously constructed otherwise than as shown on the drawings. The register-frame *k*, although it is advantageous, could also be entirely omitted in the first and second arrangements without great disadvantage to the object aimed at.

What I claim is—

1. In a chop-grader, a series of adjustable receptacles for receiving the different grades of material arranged in the form of steps, with one side common to each two adjacent receptacles, the said side being secured to the lower of the two receptacles, substantially as set forth.

2. In a chop-grader, a series of diagonally-adjustable receptacles for receiving the different grades of material arranged in the form of steps, the lower end portions of the upper receptacles being adapted to be slid in contact with the sides of the next adjacent lower receptacles, substantially as set forth.

3. In a chop-grader, the combination, with a series of adjustable receptacles arranged in the form of steps and having one side common to each two adjacent receptacles and secured to the lower of the two receptacles, of a diagonally-arranged frame divided into compartments by horizontal partitions and supported above the said series of receptacles, substantially as and for the purpose set forth.

In testimony whereof I affix my signature in presence of two witnesses.

CARL HAGGENMACHER.

Witnesses:
GEORG BAUR,
JOSEF GINDRICH.